(12) United States Patent
Gao et al.

(10) Patent No.: US 12,211,485 B2
(45) Date of Patent: Jan. 28, 2025

(54) SPEECH SYNTHESIS METHOD, AND ELECTRONIC DEVICE

(71) Applicant: BEIJING BAIDU NETCOM SCIENCE TECHNOLOGY CO., LTD., Beijing (CN)

(72) Inventors: Zhengkun Gao, Beijing (CN); Junteng Zhang, Beijing (CN); Tao Sun, Beijing (CN); Lei Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 17/820,339

(22) Filed: Aug. 17, 2022

(65) Prior Publication Data

US 2023/0005466 A1    Jan. 5, 2023

(30) Foreign Application Priority Data

Aug. 18, 2021    (CN) .......................... 202110949472.1

(51) Int. Cl.
*G10L 13/00* (2006.01)
*G10L 13/047* (2013.01)
*G10L 13/08* (2013.01)

(52) U.S. Cl.
CPC ............ *G10L 13/08* (2013.01); *G10L 13/047* (2013.01)

(58) Field of Classification Search
None
See application file for complete search history.

(56) References Cited

U.S. PATENT DOCUMENTS

2017/0345411 A1    11/2017    Raitio et al.

FOREIGN PATENT DOCUMENTS

| CN | 1889170 | | 1/2007 | |
| --- | --- | --- | --- | --- |
| CN | 103065619 | | 4/2013 | |
| CN | 111710326 | A | 9/2020 | |
| CN | 112164379 | A * | 1/2021 | ........... G10H 1/0008 |
| CN | 112349273 | | 2/2021 | |
| CN | 112365877 | | 2/2021 | |
| CN | 112382267 | | 2/2021 | |
| CN | 113012678 | A * | 6/2021 | ............. G10L 13/02 |

(Continued)

OTHER PUBLICATIONS

KIPO, Office Action for KR Application No. 10-2022-0083591, Jun. 23, 2023.

(Continued)

*Primary Examiner* — Shreyans A Patel
(74) *Attorney, Agent, or Firm* — Hodgson Russ LLP

(57) ABSTRACT

The disclosure provides a speech synthesis method, and an electronic device. The technical solution is described as follows. A text to be synthesized and speech features of a target user are obtained. Predicted first acoustic features based on the text to be synthesized and the speech features are obtained. A target template audio is obtained from a template audio library based on the text to be synthesized. Second acoustic features of the target template audio are extracted. Target acoustic features are generated by splicing the first acoustic features and the second acoustic features. Speech synthesis is performed on the text to be synthesized based on the target acoustic features and the speech features, to generate a target speech of the text to be synthesized.

18 Claims, 4 Drawing Sheets

(56) References Cited

FOREIGN PATENT DOCUMENTS

| CN | 113128212 | A | * | 7/2021 | ........... | G06F 40/205 |
| CN | 113160794 | A | * | 7/2021 | ............. | G10L 13/02 |
| CN | 113223513 | A | * | 8/2021 | | |
| CN | 113314096 | A | * | 8/2021 | | |
| KR | 20210008510 | A | | 1/2021 | | |

OTHER PUBLICATIONS

CNIPA, First Office Action for CN Application No. 202110949472.1, Mar. 2, 2022.
CNIPA, Notice of registration formalities for CN Application No. 202110949472.1, May 25, 2022.

* cited by examiner

SPEECH SYNTHESIS METHOD, AND ELECTRONIC DEVICE

CROSS REFERENCE TO RELATED APPLICATIONS

This application claims priority to Chinese Patent Application No. 202110949472.1, filed on Aug. 18, 2021, the entire disclosure of which is incorporated herein by reference.

TECHNICAL FIELD

The disclosure relates to the field of computer technology, in particular to a speech synthesis method, and an electronic device.

BACKGROUND

The existing speech synthesis methods are capable of converting text into audio having speech features of a target user, and have been widely used in fields such as speech chat and smart home. For example, in a speech chat scenario, after the user chat speech is received, a chat text matching the chat speech can be obtained, and the chat text can be converted into an audio having the speech features of the target user in real time, and then the audio can be played or fed back to a user terminal. However, the authenticity and naturalness of the synthesized speech obtained according to the speech synthesis methods in the related art are poor.

SUMMARY

According to a first aspect of the disclosure, a speech synthesis method is provided. The method includes: obtaining a text to be synthesized and speech features of a target user, and obtaining predicted first acoustic features based on the text to be synthesized and the speech features; obtaining a target template audio from a template audio library based on the text to be synthesized, and extracting second acoustic features of the target template audio; generating target acoustic features by splicing the first acoustic features and the second acoustic features; and performing speech synthesis on the text to be synthesized based on the target acoustic features and the speech features, to generate a target speech of the text to be synthesized.

According to a second aspect of the disclosure, an electronic device is provided. The electronic device includes: at least one processor and a memory communicatively coupled to the at least one processor. The memory stores instructions executable by the at least one processor, and when the instructions are executed by the at least one processor, the at least one processor is enabled to implement the speech synthesis method.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Speech includes technical fields such as speech recognition, speech separation, speech interaction and speech synthesis. Speech is an important direction in the field of artificial intelligence (AI).

Speech synthesis is a technology that enables machines to convert textual information into outputable speech, and involves fields such as acoustics, linguistics, digital signal processing, and computer science.

AI is a technical science that studies and develops theories, methods, technologies and application systems for simulating, extending and expanding human intelligence. Currently, AI technology has been widely used due to the advantages of high degree of automation, high accuracy and low cost Natural Language Processing (NLP) is a science that studies computer systems that can effectively realize natural language communication, especially software systems. NLP is an important direction in the fields of computer science and AI.

Deep learning, as a new research direction in the field of machine learning, is a science that learns the inherent laws and representation levels of sample data, so that machines can analyze and learn like human and recognize data such as texts, images and sounds. Deep learning has been widely used in speech and image recognition.

Figure 1:
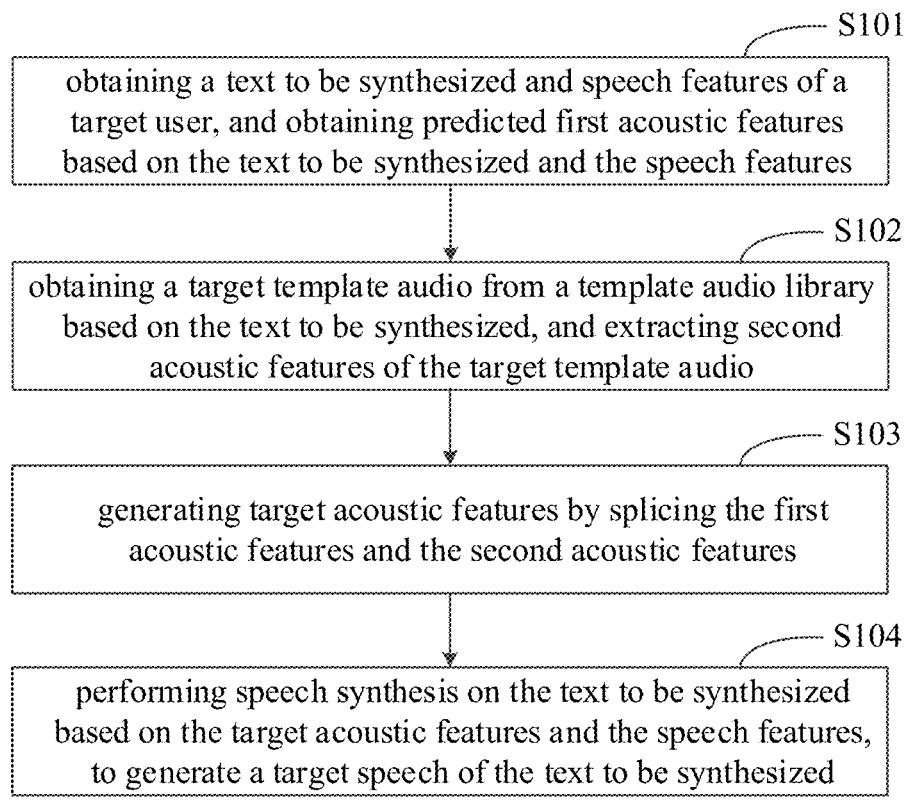
FIG. 1 is a flowchart of a speech synthesis method according to an embodiment of the disclosure.

FIG. 1 is a flowchart of a speech synthesis method according to an embodiment of the disclosure.

As illustrated in FIG. 1, a speech synthesis method according to an embodiment of the disclosure includes the following blocks.

At block S101, a text to be synthesized and speech features of a target user are obtained, and predicted first acoustic features are obtained based on the text to be synthesized and the speech features.

It should be noted that the executive body of the speech synthesis method in the embodiment of the disclosure may be a hardware device having data information processing capability and/or a necessary software for driving the hardware device to operate. Optionally, the executive body may include a workstation, a server, a computer, a user terminal and other intelligent devices. The user terminal includes but not limited to a mobile phone, a computer, an intelligent speech interaction device, a smart home appliance, and a vehicle-mounted terminal.

In the embodiment of the disclosure, the text to be synthesized is obtained. It should be noted that the language and type of the text to be synthesized are not limited. For example, the language of the text to be synthesized includes but not limited to Chinese and English, and the type of the text to be synthesized includes but not limited to chat text and speech text.

In the embodiment of the disclosure, the speech features of the target user can be obtained. It is understood that different target users may have different speech features. It should be noted that the types of speech features are not limited herein.

In an embodiment, the speech features of the target user can be stored locally in advance, so that the speech features of the target user can be obtained from the local storage space during speech synthesis, that is, the speech features of the target user can be obtained offline, which effectively reduces the amount of computation of speech synthesis.

In the embodiment of the disclosure, the predicted first acoustic features are obtained based on the text to be synthesized and the speech features. Since the influence of the text to be synthesized and of the speech features of the target user on the predicted first acoustic features is comprehensively considered, the predicted first acoustic features contain the features of the text to be synthesized and the speech features, and thus personalized speech synthesis can be realized.

In an embodiment, obtaining the predicted first acoustic features based on the text to be synthesized and the speech features includes: inputting the text to be synthesized and the speech features into a feature prediction model, so that the feature prediction model outputs the predicted first acoustic features. The feature prediction model can be set according to the actual situation, which is not limited here.

At block S102, a target template audio is obtained from a template audio library based on the text to be synthesized, and second acoustic features of the target template audio are extracted.

In the embodiment of the disclosure, the template audio library is obtained. The template audio library includes a plurality of template audios. It is understood that the template audio library can be set according to the actual situation, which is not limited here.

In the embodiment of the disclosure, the target template audio is obtained from the template audio library based on the text to be synthesized. Further, the second acoustic features of the target template audio are extracted.

In an embodiment, extracting the second acoustic features of the target template audio includes: inputting the target template audio into a feature extraction model, so that the feature extraction model outputs the second acoustic features. The feature extraction model can be set according to the actual situation, which is not limited here.

At block S103, target acoustic features are generated by splicing the first acoustic features and the second acoustic features.

In the embodiment of the disclosure, the target acoustic features are generated by splicing the first acoustic features and the second acoustic features. The generated target acoustic features have both the first acoustic features of the text to be synthesized and the second acoustic features of the target template audio, and thus a good feature representing effect is achieved.

In an embodiment, generating the target acoustic features by splicing the first acoustic features and the second acoustic features includes: obtaining a target template text corresponding to the target template audio; determining splicing positions between the first acoustic features and the second acoustic features based on the target template text and the text to be synthesized; and generating the target acoustic features by splicing the first acoustic features and the second acoustic features according to the splicing positions.

For example, if the text to be synthesized is "Your call charges this month is 16 yuan", and the target template text corresponding to the target template audio is "Your call charges this month is 100 yuan", the splicing position of feature 2 corresponding to "16" in the first acoustic features is determined as the feature position corresponding to "100" in the second acoustic features, and then feature 1 corresponding to "Your call charges this month is" in the second acoustic features, feature 2 corresponding to "16" in the first acoustic features, and feature 3 corresponding to "yuan" in the second acoustic features are spliced, in which, feature 1 is prior to feature 2 in sequence, and feature 2 is prior to feature 3 in sequence.

At block S104, speech synthesis is performed on the text to be synthesized based on the target acoustic features and the speech features, to generate a target speech of the text to be synthesized.

In the embodiment of the disclosure, the target speech of the text to be synthesized is generated by performing the speech synthesis on the text to be synthesized based on the target acoustic features and the speech features.

In an embodiment, performing speech synthesis on the text to be synthesized based on the target acoustic features and the speech features, to generate the target speech of the text to be synthesized includes: inputting the target acoustic features, the speech features and the text to be synthesized into a speech synthesis model, so that the speech synthesis model outputs the target speech of the text to be synthesized. The speech synthesis model can be set according to the actual situation, which is not limited here.

In conclusion, according to the speech synthesis method, the predicted first acoustic features are obtained based on the text to be synthesized and the speech features, and the second acoustic features of the target template audio are extracted. The target acoustic features are obtained by splicing the first acoustic features and the second acoustic features. Then speech synthesis is performed on the text to be synthesized based on the target acoustic features and the speech features, to generate the target speech of the text to be synthesized. Thus, the target acoustic features contain the first acoustic features of the text to be synthesized and the second acoustic features of the target template audio, so that a good feature representing effect is achieved, which facilitates the improvement of the authenticity and naturalness of the target speech, and achieves a better speech synthesis effect.

Figure 2:
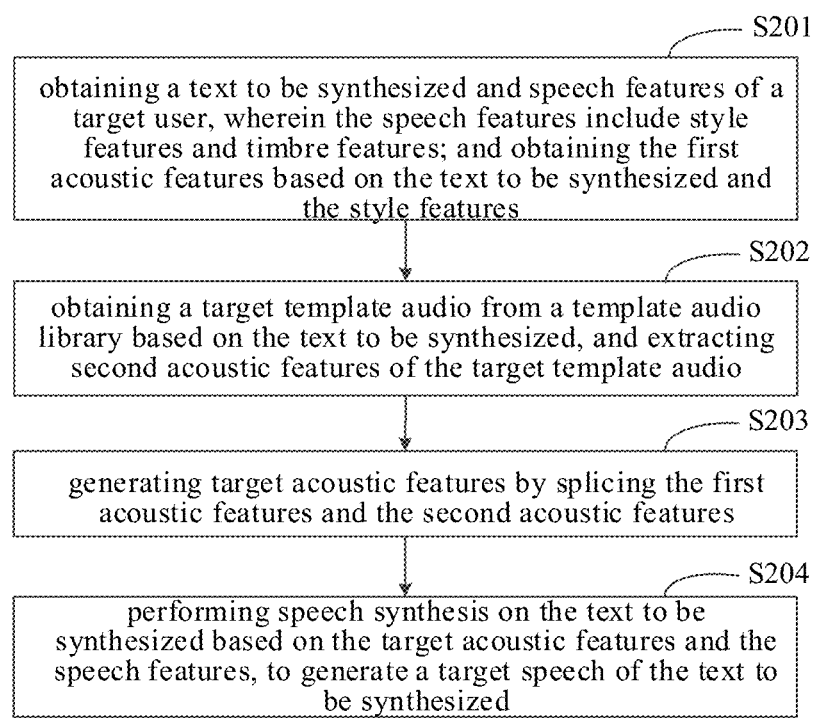
FIG. 2 is a flowchart of a speech synthesis method according to another embodiment of the disclosure.

FIG. 2 is a flowchart of a speech synthesis method according to another embodiment of the disclosure.

As illustrated in FIG. 2, the speech synthesis method according to the second embodiment of the disclosure includes the following blocks.

At block S201, a text to be synthesized and speech features of a target user are obtained, and the speech features include style features and timbre features, and the predicted first acoustic features are obtained based on the text to be synthesized and the style features.

In the embodiment of the disclosure, there is a correspondence between the identification information of the target user and the speech features of the target user. The identification information can be set according to the actual situation, which is not limited here. For example, the identification information of the target user can be set as "Zhang San" or "Li Si".

In the embodiment of the disclosure, obtaining the speech features of the target user includes: obtaining identification information of the target user; and obtaining the speech features of the target user based on the identification information. Therefore, the speech features of the target user can be obtained based on the identification information of the target user.

For example, a mapping relation or a mapping table between the identification information and the speech features of the target user can be generated in advance. After the identification information of the target user is obtained, the speech features mapped by the identification information are obtained by querying the identification information in the above mapping relation or the mapping table, and the speech features are determined as the speech features of the target user.

In the embodiment of the disclosure, the speech features may include the style features and the timbre features. The style features are used to distinguish different styles of a user, and the timbre features can be used to distinguish different users.

In the embodiment of the disclosure, the predicted first acoustic features are obtained based on the text to be synthesized and the style features.

In an embodiment, obtaining the first acoustic features based on the text to be synthesized and the style features includes: obtaining vector features by performing vectorization processing on the text to be synthesized; obtaining text features of the text to be synthesized by performing convolution processing and bi-directional time loop processing on the vector features; obtaining first splicing features by splicing the text features and the style features; and obtaining the first acoustic features by performing the convolution processing, the bidirectional time loop processing and linear processing sequentially on the first splicing features.

Optionally, obtaining the first splicing features by splicing the text features and the style features includes: determining a sum of the text features and the style features as the first splicing features.

In the embodiment of the disclosure, the acoustic features include at least one of fundamental frequency features, energy features and time duration features. It should be noted that the granularity of the acoustic features is not limited too much, for example, the granularity of the acoustic features may be phoneme granularity.

At block S202, a target template audio is obtained from a template audio library based on the text to be synthesized, and second acoustic features of the target template audio are extracted.

In the embodiment of the disclosure, obtaining the target template audio from the template audio library based on the text to be synthesized includes: obtaining template texts corresponding to template audios in the template audio library; obtaining a similarity between the text to be synthesized and the template texts; and determining the template audio corresponding to the template text with the highest similarity as the target template audio. Therefore, according to the method, the template audio corresponding to the template text with the highest similarity is selected from the template audio library as the target template audio. Since the selected target template audio has the highest matching degree with the text to be synthesized, the effect of speech synthesis is good.

For example, in the intelligent customer service scene, the template audio library includes template audios A, B, C and D, and template audios A, B, C and D correspond to template texts a, b, c and d respectively, in which template text a is "Your call charges this month is 100 yuan", template text b is "You have successfully added 100 yuan to your credit", template text c is "Your account balance is 100 yuan", and template text d is "Your remaining universal data for this month is 5 GB". The text to be synthesized is "Your call charges this month is 16 yuan", and it can be known that the text to be synthesized has the highest similarity with template text a, and the target template audio can be obtained from the template audio library as template audio A.

At block S203, target acoustic features are generated by splicing the first acoustic features and the second acoustic features.

At block S204, speech synthesis is performed on the text to be synthesized based on the target acoustic features and the speech features, to generate a target speech of the text to be synthesized.

For the relevant content of steps S203-S204, reference may be made to the above embodiments, which will not be repeated here.

In conclusion, according to the speech synthesis method of the embodiment of the disclosure, the speech features include style features and timbre features, and the predicted first acoustic features can be obtained according to the text to be synthesized and the style features. The influence of the text to be synthesized and of the style features of the target user on the predicted first acoustic features can be comprehensively considered, so that the predicted first acoustic features contain the style features of the target user, which helps to improve the personalized speech synthesis.

Figure 3:
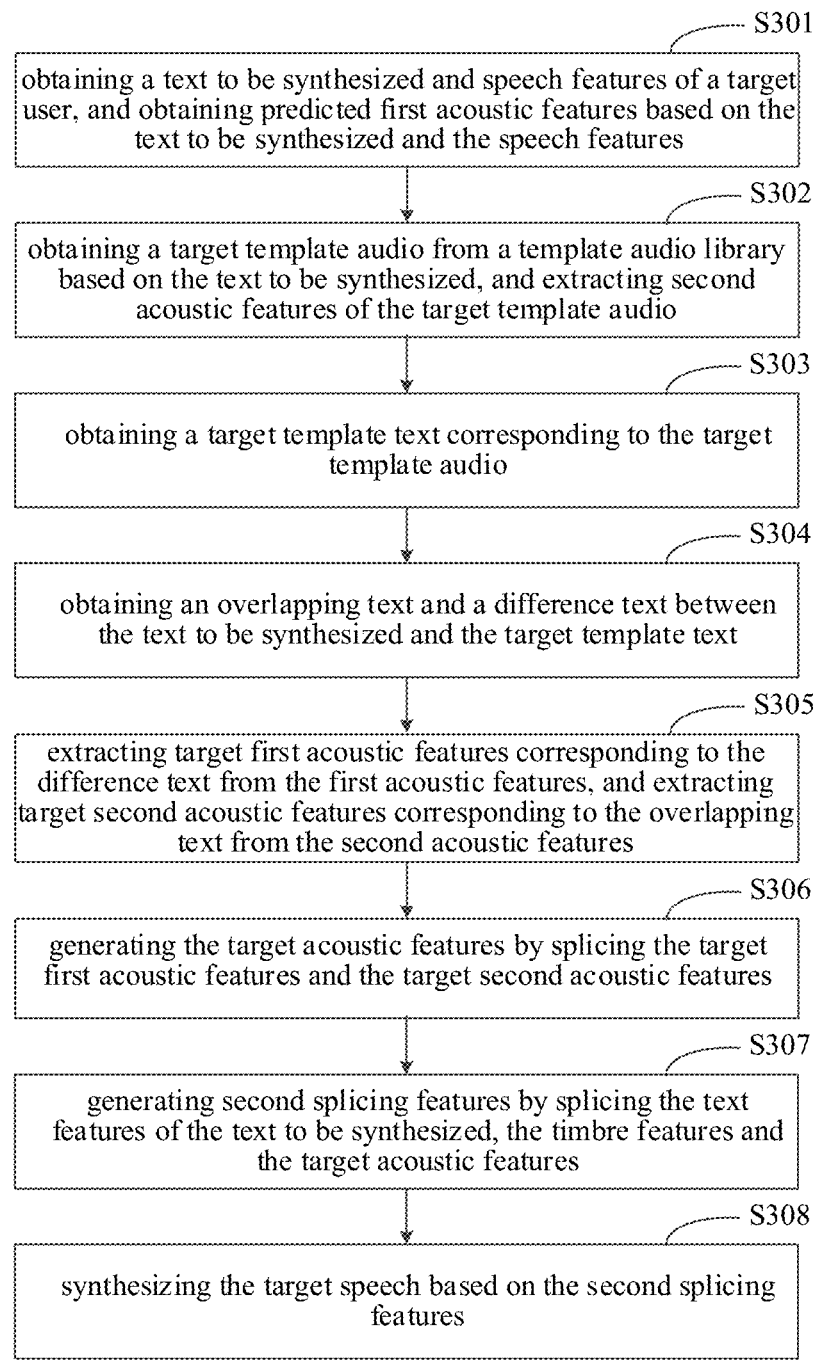
FIG. 3 is a flowchart of a speech synthesis method according to a further embodiment of the disclosure.

FIG. 3 is a flowchart of a speech synthesis method according to a further embodiment of the disclosure.

As illustrated in FIG. 3, the speech synthesis method according to a further embodiment of the disclosure includes the following blocks.

At block S301, a text to be synthesized and speech features of a target user are obtained, and predicted first acoustic features are obtained based on the text to be synthesized and the speech features.

At block S302, a target template audio is obtained from a template audio library based on the text to be synthesized, and second acoustic features of the target template audio are extracted.

For the relevant content of steps S301-S302, reference may be made to the foregoing embodiments, and details are not repeated here.

At block S303, a target template text corresponding to the target template audio is obtained. In the embodiment of the disclosure, there is a correspondence between the template audios and the template texts, and different template audios correspond to different template texts, and the target template text corresponding to the target template audio can be obtained.

In an embodiment, the mapping relation or mapping table between the template audios and the template texts can be generated in advance. After obtaining the target template audio, the template text mapped by the target template audio and obtained by querying the above mapping relation or mapping table, is determined as the target template text. It should be noted that, the above mapping relation or mapping table can be set according to the actual situation, which is not limited here.

For example, in the intelligent customer service scene, the template audio library includes template audios A, B, C and D, and template audios A, B, C and D correspond to template texts a, b, c and d respectively, in which template text a is "Your call charges this month is 100 yuan", template text b is "You have successfully added 100 yuan to your credit", template text c is "Your account balance is 100 yuan", and template text d is "Your remaining universal data for this month is 5 GB". If the target template audio is template audio A, template text a "Your call charges this month is 100 yuan" is determined as the target template text.

At block S304, an overlapping text and a difference text between the text to be synthesized and the target template text are obtained.

In the embodiment of the disclosure, the text to be synthesized and the target template text may have identical parts and different parts. The text to be synthesized is compared with the target template text, to obtain the overlapping texts and the difference texts between the text to be synthesized and the target template text.

It is understood that the text to be synthesized and the target template text both include the overlapping text.

In an embodiment, the difference text refers to the text in the text to be synthesized that differs from the target template text.

For example, if the text to be synthesized is "Your call charges this month is 16 yuan", and the target template text is "Your call charges this month is 100 yuan", the overlapping texts are "Your call charges this month is" and "yuan", and the difference text is "16".

At block S305, target first acoustic features corresponding to the difference text are extracted from the first acoustic features, and target second acoustic features corresponding to the overlapping text are extracted from the second acoustic features.

In the embodiments of the disclosure, the text to be synthesized may include the difference text, and the target first acoustic features corresponding to the difference text may be extracted from the first acoustic features corresponding to the text to be synthesized. The target template text corresponding to the target template audio includes the overlapping text, and the target second acoustic features corresponding to the overlapping text may be extracted from the second acoustic features corresponding to the target template audio.

For example, if the text to be synthesized is "Your call charges this month is 16 yuan" and the target template text is "Your call charges this month is 100 yuan", the overlapping texts are "Your call charges this month is" and "yuan", and the difference text may be "16", and then the target first acoustic features corresponding to "16" are extracted from the first acoustic features, and the target second acoustic features corresponding to "Your call charges this month is" and "yuan" are extracted from the second acoustic features.

In an embodiment, extracting the target first acoustic features corresponding to the difference text from the first acoustic features includes: obtaining a first start position and a first end position of the difference text in the text to be synthesized; and extracting acoustic features corresponding to positions between the first start position and the first end position from the first acoustic features, and determining the extracted acoustic features as the target first acoustic features. Therefore, the target first acoustic features are accurately extracted from the first acoustic features based on the first start position and the first end position.

For example, if the text to be synthesized is "Your call charges this month is 16 yuan", and the difference text is "16", the first start position of the difference text "16" in the text to be synthesized is the text position corresponding to "1", and the first end position is the text position corresponding to "6". The acoustic features corresponding to positions between the first start position and the first end position are extracted from the first acoustic features and determined as the target first acoustic features.

In an embodiment, extracting the target second acoustic features corresponding to the overlapping text from the second acoustic features includes: obtaining a second start position and a second end position of the overlapping text in the target template text; extracting acoustic features corresponding to positions between the second start position and the second end position from the second acoustic features; and determining the extracted acoustic features as the target second acoustic features. Therefore, the target second acoustic features are extracted from the second acoustic features accurately based on the second start position and the second end position.

For example, if the target template text is "Your call charges this month is 100 yuan", and the overlapping texts are "Your call charges this month is" and "yuan", the second start position of the overlapping text "Your call charges this month is" in the target template text is the text position corresponding to "Your" and the second end position is the text position corresponding to "is", and the second start position and the second end position of the overlapping text "yuan" in the target template text are both the text position corresponding to "yuan", and thus the acoustic features corresponding to the positions between the second start position and the second end position are extracted from the second acoustic features, and the extracted acoustic features may be determined as the target second acoustic features.

In an embodiment, extracting the acoustic features corresponding to the positions between the first start position and the first end position from the first acoustic features include: obtaining a correspondence between the text positions of the text to be synthesized and the feature positions of the first acoustic features; obtaining a third start position and a third end position corresponding to the first start position and the first end position in the first acoustic features based on the correspondence; and extracting acoustic features corresponding to the positions between the third start position and the third end position from the first acoustic features.

It should be noted that, the relevant content of extracting the acoustic features corresponding to the positions between the second start position and the second end position from the second acoustic features, refer to the relevant content of extracting the acoustic features corresponding to the positions between the first start position and the first end position from the first acoustic features, which is not repeated here.

At block S306, target acoustic features are generated by splicing the first acoustic features and the second acoustic features.

For the relevant content of step S306, reference may be made to the above embodiments, which will not be repeated here.

At block S307, second splicing features are generated by splicing the text features of the text to be synthesized, the timbre features and the target acoustic features.

It should be noted that, for the relevant content of the text features of the text to be synthesized, reference may be made to the above embodiments, which will not be repeated here.

In the embodiment of the disclosure, the second splicing features are generated by splicing the text features of the text to be synthesized, the timbre features and the target acoustic features, so that the second splicing features contain the text features of the text to be synthesized, the timbre features and the target acoustic features at the same time, and the feature representing effect is good.

In an embodiment, generating the second splicing features by splicing the text features of the text to be synthesized, the timbre features and the target acoustic features include: determining a sum of the text features, the timbre features and the target acoustic features as the second splicing features.

At block S308, the target speech is synthesized based on the second splicing features.

In an embodiment, synthesizing the target speech based on the second splicing features include: inputting the second splicing features into a speech synthesis model, so that the speech synthesis model outputs the target speech of the text to be synthesized. The speech synthesis model can be set according to the actual situation, which is not limited here.

In conclusion, according to the speech synthesis method of the embodiments of the disclosure, the target first acoustic features corresponding to the difference text are extracted from the first acoustic features based on the overlapping text and the difference text between the text to be synthesized and the target template text. The target second acoustic features corresponding to the overlapping text are extracted from the second acoustic features. The target first acoustic features and the target second acoustic features are spliced to generate the target acoustic features. The text features of the text to be synthesized, the timbre features and the target acoustic features are spliced to generate the second splicing features. The target speech is synthesized based on the second splicing features, so that the target speech has the timbre features of the target user, which is helpful to improve the personalized speech synthesis.

In the embodiment of the disclosure, a pre-trained target speech synthesis model may be obtained, the text to be synthesized, the target template audio and the speech features are input into the target speech synthesis model, so that the target speech synthesis model outputs the target speech of the text to be synthesized. Therefore, speech synthesis performed by the target speech synthesis model is automatically realized, which helps to improve the speech synthesis efficiency.

It is understood that the target speech synthesis model can be set according to the actual situation, which is not limited here. For example, the target speech synthesis model may be a neural network model.

Figure 4:
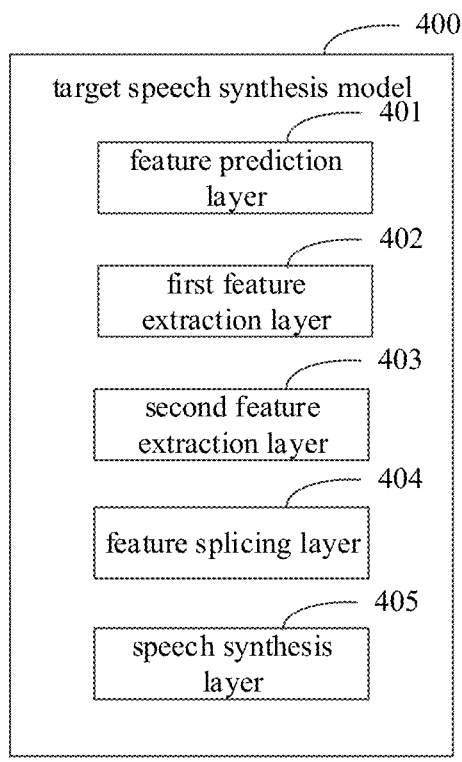
FIG. 4 is a schematic diagram of a target speech synthesis model according to an embodiment of the disclosure.

As illustrated in FIG. 4, the target speech synthesis model 400 includes a feature prediction layer 401, a first feature extraction layer 402, a second feature extraction layer 403, a feature splicing layer 404 and a speech synthesis layer 405.

The feature prediction layer 401 obtains the predicted first acoustic features based on the text to be synthesized and the speech features.

The first feature extraction layer 402 extracts the second acoustic features of the target template audio.

The second feature extraction layer 403 extracts the text features of the text to be synthesized.

The feature splicing layer 404 generates the target acoustic features by splicing the first acoustic features and the second acoustic features, and generates the second splicing features by splicing the text features, the timbre features and the target acoustic features.

The speech synthesis layer 405 synthesizes the target speech based on the second splicing features.

In an embodiment, training samples may be obtained. The training samples include sample texts to be synthesized, sample target template audios, speech features and sample target speeches of sample target users. It can be understood that the training samples can be set according to the actual situation, which are not limited here.

The speech synthesis model is trained based on the training samples. In response to not satisfying model training end conditions, the next training sample is used to continue training the speech synthesis model and adjust the model parameters until the model training end conditions are satisfied, and then the target speech synthesis model is obtained. The model training end conditions can be set according to the actual situation, which is not limited here. For example, the model training end conditions may include: a number of times of model training reaching a preset threshold value, and a model accuracy reaching a preset accuracy threshold value.

Figure 5:
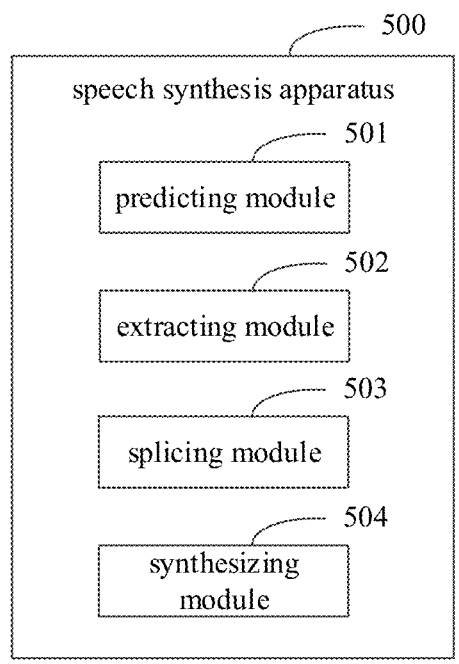
FIG. 5 is a block diagram of a speech synthesis apparatus according to an embodiment of the disclosure.

FIG. 5 is a block diagram of a speech synthesis apparatus according to an embodiment of the disclosure.

As illustrated in FIG. 5, the speech synthesis apparatus 500 includes: a predicting module 501, an extracting module 502, a splicing module 503 and a synthesizing module 504.

The predicting module 501 is configured to obtain a text to be synthesized and speech features of a target user, and obtain predicted first acoustic features based on the text to be synthesized and the speech features.

The extracting module 502 is configured to obtain a target template audio from a template audio library based on the text to be synthesized, and extract second acoustic features of the target template audio.

The splicing module 503 is configured to generate target acoustic features by splicing the first acoustic features and the second acoustic features.

The synthesizing module 504 is configured to perform speech synthesis on the text to be synthesized based on the target acoustic features and the speech features, to generate a target speech of the text to be synthesized.

In the embodiment of the disclosure, the splicing module 503 includes: a first obtaining unit, a second obtaining unit, an extracting unit and a splicing unit. The first obtaining unit is configured to obtain a target template text corresponding to the target template audio. The second obtaining unit is configured to obtain at least one overlapping text and at least one difference text between the text to be synthesized and the target template text. The extracting unit is configured to extract target first acoustic features corresponding to the difference text from the first acoustic features, and extract target second acoustic features corresponding to the overlapping text from the second acoustic features. The splicing unit is configured to generate the target acoustic features by splicing the target first acoustic features and the target second acoustic features.

In the embodiment of the disclosure, the extracting unit is further configured to: obtain a first start position and a first end position of the difference text in the text to be synthesized; extract acoustic features corresponding to positions between the first start position and the first end position from the first acoustic features, and determine the extracted acoustic features as the target first acoustic features; obtain a second start position and a second end position of the overlapping text in the target template text; and extract acoustic features corresponding to positions between the second start position and the second end position from the second acoustic features, and determine the extracted acoustic features as the target second acoustic features.

In the embodiment of the disclosure, the predicting module 501 is further configured to: obtain identification information of the target user; and obtain the speech features of the target user based on the identification information.

In the embodiment of the disclosure, the speech features include style features and timbre features, and the predicting module 501 is further configured to: obtain the first acoustic features based on the text to be synthesized and the style features.

In the embodiment of the disclosure, the predicting module 501 is further configured to: obtain vector features by performing vectorization processing on the text to be synthesized; obtain text features of the text to be synthesized by performing convolution processing and bi-directional time loop processing on the vector features; obtain first splicing features by splicing the text features and the style features; and obtain the first acoustic features by performing the convolution processing, the bidirectional time loop processing and linear processing sequentially on the first splicing features.

In the embodiment of the disclosure, the synthesizing module 504 is further configured to: generate second splicing features by splicing the text features of the text to be synthesized, the timbre features and the target acoustic features; and synthesize the target speech based on the second splicing features.

In the embodiment of the disclosure, the apparatus further includes: an inputting module, and the inputting module is configured to: input the text to be synthesized, the target template audio and the speech features into a target speech synthesis model, in which the target speech synthesis model includes a feature prediction layer, a first feature extraction layer, a second feature extraction layer, a feature splicing layer and a speech synthesis layer; obtain the first acoustic features by the feature prediction layer based on the text to be synthesized and the speech features; extract the second acoustic features of the target template audio by the first feature extraction layer; extract the text features of the text to be synthesized by the second feature extraction layer; generate the target acoustic features by splicing the first acoustic features and the second acoustic features using the feature splicing layer, and generate the second splicing features by splicing the text features, the timbre features and the target acoustic features using the feature splicing layer; and synthesize the target speech based on the second splicing features by the speech synthesis layer.

In the embodiment of the disclosure, the extracting module 502 is further configured to: obtain template texts corresponding to template audios in the template audio library; obtain a similarity between the text to be synthesized and the template texts; and determine the template audio corresponding to the template text with the highest similarity as the target template audio.

In the embodiment of the disclosure, the acoustic features include at least one of fundamental frequency features, energy features and time duration features.

In conclusion, with the speech synthesis apparatus according to the embodiments of the disclosure, the predicted first acoustic features are obtained based on the text to be synthesized and the speech features. The second acoustic features of the target template audio are extracted. The target acoustic features are obtained by splicing the first acoustic features and the second acoustic features. Then, speech synthesis is performed on the text to be synthesized based on the target acoustic features and the speech features, to generate the target speech of the text to be synthesized. Therefore, the target acoustic features contain the first acoustic features of the text to be synthesized and the second acoustic features of the target template audio at the same time, so that a good feature representing effect is achieved, which facilitates to improve the authenticity and naturalness of the target speech, and achieve a better speech synthesis effect.

In the technical solution of the disclosure, the collection, storage, use, processing, transmission, provision and disclosure of the user's personal information involved are all in compliance with relevant laws and regulations, and do not violate public order and good customs.

According to the embodiments of the disclosure, the disclosure provides an electronic device, a readable storage medium and a computer program product.

Figure 6:
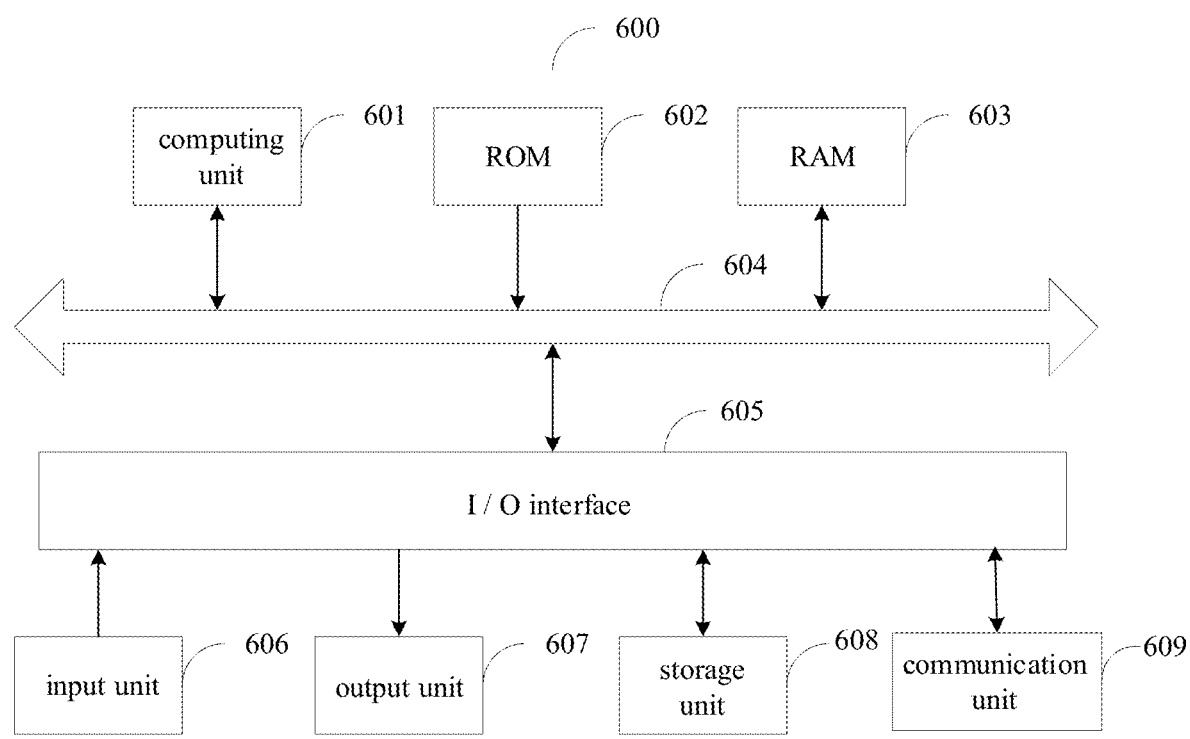
FIG. 6 is a block diagram of an electronic device used to implement the speech synthesis method according to an embodiment of the disclosure.

FIG. 6 is a block diagram of an example electronic device 600 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device 600 includes: a computing unit 601 performing various appropriate actions and processes based on computer programs stored in a read-only memory (ROM) 602 or computer programs loaded from the storage unit 608 to a random access memory (RAM) 603. In the RAM 603, various programs and data required for the operation of the device 600 are stored. The computing unit 601, the ROM 602, and the RAM 603 are connected to each other through a bus 604. An input/output (I/O) interface 605 is also connected to the bus 604.

Components in the device 600 are connected to the I/O interface 605, including: an inputting unit 606, such as a keyboard, a mouse; an outputting unit 607, such as various types of displays, speakers; a storage unit 608, such as a disk, an optical disk; and a communication unit 609, such as network cards, modems, and wireless communication transceivers. The communication unit 609 allows the device 600 to exchange information/data with other devices through a computer network such as the Internet and/or various telecommunication networks.

The computing unit 601 may be various general-purpose and/or dedicated processing components with processing and computing capabilities. Some examples of computing unit 601 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 601 executes the various methods and processes described above, such as the speech synthesis method. For example, in some embodiments, the speech synthesis method may be implemented as a computer software program, which is tangibly contained in a machine-readable medium, such as the storage unit 608. In some embodiments, part or all of the computer program may be loaded and/or installed on the device 600 via the ROM 602 and/or the communication unit 609. When the computer program is loaded on the RAM 603 and executed by the computing unit 601, one or more steps of the speech synthesis method described above may be executed. Alternatively, in other embodiments, the computing unit 601 may be configured to perform the speech synthesis method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, speech input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or a computing system that includes any combination of such background components, intermediate computing components, or front-end components. The components of the system may be interconnected by any form or medium of digital data communication (e.g., a communication network). Examples of communication networks include: a local area network (LAN), a wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

According to the embodiment of the disclosure, the disclosure also provides a computer program product including computer programs. When the computer programs are executed by a processor, the speech synthesis method according to the embodiments of the disclosure is implemented.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:
1. A speech synthesis method, comprising:
obtaining predicted first acoustic features based on a text to be synthesized and speech features of a target user;
obtaining a target template audio from a template audio library based on the text to be synthesized, and extracting second acoustic features of the target template audio;
generating target acoustic features by splicing the first acoustic features and the second acoustic features; and
performing speech synthesis on the text to be synthesized based on the target acoustic features and the speech features, to generate a target speech of the text to be synthesized,
wherein generating the target acoustic features by splicing the first acoustic features and the second acoustic features, comprises:

obtaining a target template text corresponding to the target template audio;
obtaining an overlapping text and a difference text between the text to be synthesized and the target template text;
extracting target first acoustic features corresponding to the difference text from the first acoustic features, and extracting target second acoustic features corresponding to the overlapping text from the second acoustic features; and
generating the target acoustic features by splicing the target first acoustic features and the target second acoustic features.

2. The method of claim 1, wherein extracting the target first acoustic features corresponding to the difference text from the first acoustic features, comprises:
obtaining a first start position and a first end position of the difference text in the text to be synthesized; and
extracting acoustic features corresponding to positions between the first start position and the first end position from the first acoustic features, and determining the acoustic features extracted as the target first acoustic features,
wherein extracting the target second acoustic features corresponding to the overlapping text from the second acoustic features, comprises:
obtaining a second start position and a second end position of the overlapping text in the target template text; and
extracting acoustic features corresponding to positions between the second start position and the second end position from the second acoustic features, and determining the acoustic features extracted as the target second acoustic features.

3. The method of claim 1, wherein the speech features of the target user are obtained by:
obtaining identification information of the target user; and
obtaining the speech features of the target user based on the identification information.

4. The method of claim 3, wherein the speech features comprise style features and timbre features, and obtaining the predicted first acoustic features based on the text to be synthesized and the speech features, comprises:
obtaining the first acoustic features based on the text to be synthesized and the style features.

5. The method of claim 4, wherein obtaining the first acoustic features based on the text to be synthesized and the style features, comprises:
obtaining vector features by performing vectorization processing on the text to be synthesized;
obtaining text features of the text to be synthesized by performing convolution processing and bi-directional time loop processing on the vector features;
obtaining first splicing features by splicing the text features and the style features; and
obtaining the first acoustic features by performing the convolution processing, the bi-directional time loop processing and linear processing sequentially on the first splicing features.

6. The method of claim 4, wherein performing the speech synthesis on the text to be synthesized based on the target acoustic features and the speech features, to generate the target speech of the text to be synthesized, comprises:
generating second splicing features by splicing the text features of the text to be synthesized, the timbre features and the target acoustic features; and
synthesizing the target speech based on the second splicing features.

7. The method of claim 6, further comprising:
inputting the text to be synthesized, the target template audio and the speech features into a target speech synthesis model, wherein the target speech synthesis model comprises a feature prediction layer, a first feature extraction layer, a second feature extraction layer, a feature splicing layer and a speech synthesis layer;
obtaining the first acoustic features by the feature prediction layer based on the text to be synthesized and the speech features;
extracting the second acoustic features of the target template audio by the first feature extraction layer;
extracting the text features of the text to be synthesized by the second feature extraction layer;
generating the target acoustic features by splicing the first acoustic features and the second acoustic features by the feature splicing layer, and generating the second splicing features by splicing the text features, the timbre features and the target acoustic features by the feature splicing layer; and
synthesizing the target speech based on the second splicing features by the speech synthesis layer.

8. The method of claim 1, wherein obtaining the target template audio from the template audio library based on the text to be synthesized, comprises:
obtaining template texts corresponding to template audios in the template audio library;
obtaining a similarity between the text to be synthesized and the template texts; and
determining a template audio corresponding to the template text with the highest similarity as the target template audio.

9. The method of claim 1, wherein the acoustic features comprise at least one of fundamental frequency features, energy features and time duration features.

10. An electronic device, comprising:
at least one processor; and
a memory communicatively coupled to the at least one processor;
wherein the memory stores instructions executable by the at least one processor, when the instructions are executed by the at least one processor, the at least one processor is enabled to perform the following:
obtaining predicted first acoustic features based on a text to be synthesized and speech features of a target user;
obtaining a target template audio from a template audio library based on the text to be synthesized, and extracting second acoustic features of the target template audio;
generating target acoustic features by splicing the first acoustic features and the second acoustic features; and
performing speech synthesis on the text to be synthesized based on the target acoustic features and the speech features, to generate a target speech of the text to be synthesized,
wherein generating the target acoustic features by splicing the first acoustic features and the second acoustic features, comprises:
obtaining a target template text corresponding to the target template audio;

obtaining an overlapping text and a difference text between the text to be synthesized and the target template text;

extracting target first acoustic features corresponding to the difference text from the first acoustic features, and extracting target second acoustic features corresponding to the overlapping text from the second acoustic features; and generating the target acoustic features by splicing the target first acoustic features and the target second acoustic features.

11. The device of claim 10, wherein extracting the target first acoustic features corresponding to the difference text from the first acoustic features, comprises:

obtaining a first start position and a first end position of the difference text in the text to be synthesized; and extracting acoustic features corresponding to positions between the first start position and the first end position from the first acoustic features, and determining the acoustic features extracted as the target first acoustic features, wherein extracting the target second acoustic features corresponding to the overlapping text from the second acoustic features, comprises:

obtaining a second start position and a second end position of the overlapping text in the target template text; and extracting acoustic features corresponding to positions between the second start position and the second end position from the second acoustic features, and determining the acoustic features extracted as the target second acoustic features.

12. The device of claim 10, wherein the speech features of the target user are obtained by:

obtaining identification information of the target user; and obtaining the speech features of the target user based on the identification information.

13. The device of claim 12, wherein the speech features comprise style features and timbre features, and obtaining the predicted first acoustic features based on the text to be synthesized and the speech features, comprises:

obtaining the first acoustic features based on the text to be synthesized and the style features.

14. The device of claim 13, wherein obtaining the first acoustic features based on the text to be synthesized and the style features, comprises:

obtaining vector features by performing vectorization processing on the text to be synthesized;

obtaining text features of the text to be synthesized by performing convolution processing and bi-directional time loop processing on the vector features;

obtaining first splicing features by splicing the text features and the style features; and obtaining the first acoustic features by performing the convolution processing, the bi-directional time loop processing and linear processing sequentially on the first splicing features.

15. The device of claim 13, wherein performing the speech synthesis on the text to be synthesized based on the target acoustic features and the speech features, to generate the target speech of the text to be synthesized, comprises:

generating second splicing features by splicing the text features of the text to be synthesized, the timbre features and the target acoustic features; and synthesizing the target speech based on the second splicing features.

16. The device of claim 15, wherein the at least one processor is further configured to perform the following:

inputting the text to be synthesized, the target template audio and the speech features into a target speech synthesis model, wherein the target speech synthesis model comprises a feature prediction layer, a first feature extraction layer, a second feature extraction layer, a feature splicing layer and a speech synthesis layer;

obtaining the first acoustic features by the feature prediction layer based on the text to be synthesized and the speech features;

extracting the second acoustic features of the target template audio by the first feature extraction layer;

extracting the text features of the text to be synthesized by the second feature extraction layer;

generating the target acoustic features by splicing the first acoustic features and the second acoustic features by the feature splicing layer, and generating the second splicing features by splicing the text features, the timbre features and the target acoustic features by the feature splicing layer; and synthesizing the target speech based on the second splicing features by the speech synthesis layer.

17. The device of claim 10, wherein obtaining the target template audio from the template audio library based on the text to be synthesized, comprises:

obtaining template texts corresponding to template audios in the template audio library;

obtaining a similarity between the text to be synthesized and the template texts; and determining a template audio corresponding to the template text with the highest similarity as the target template audio.

18. A non-transitory computer-readable storage medium having computer instructions stored thereon, wherein the computer instructions are configured to cause a computer to implement the method of claim 1.

* * * * *